(12) United States Patent
Rashid et al.

(10) Patent No.: US 11,080,723 B2
(45) Date of Patent: Aug. 3, 2021

(54) REAL TIME EVENT AUDIENCE SENTIMENT ANALYSIS UTILIZING BIOMETRIC DATA

(71) Applicant: International Business Machines Corporation, Armonk, NY (US)

(72) Inventors: Sheraz Rashid, Salem, NH (US); Omar Z. Raza, Lowell, MA (US); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 349 days.

(21) Appl. No.: 15/452,219

(22) Filed: Mar. 7, 2017

(65) Prior Publication Data
US 2018/0260825 A1 Sep. 13, 2018

(51) Int. Cl.
*G06Q 30/02* (2012.01)
*G06Q 50/00* (2012.01)

(52) U.S. Cl.
CPC ........ *G06Q 30/0201* (2013.01); *G06Q 50/01* (2013.01)

(58) Field of Classification Search
CPC .... G06Q 30/02; G06Q 10/1095; G06Q 50/01; H04L 12/1822; H04L 67/22
See application file for complete search history.

(56) References Cited

U.S. PATENT DOCUMENTS

| | | | |
|---|---|---|---|
| 7,769,207 B2 | 8/2010 | Olivo, Jr. et al. | |
| 8,670,018 B2 | 3/2014 | Cunnington et al. | |
| 9,020,956 B1 * | 4/2015 | Barr | G06F 17/30864 |
| | | | 707/748 |
| 9,189,797 B2 * | 11/2015 | Ghosh | G06Q 30/02 |
| 9,336,268 B1 * | 5/2016 | Moudy | G06F 17/30412 |
| 9,369,536 B1 * | 6/2016 | Holtzclaw | G06Q 50/01 |
| 9,386,110 B2 * | 7/2016 | Cudak | H04L 67/22 |
| 9,420,227 B1 | 8/2016 | Shires et al. | |
| 9,633,008 B1 * | 4/2017 | Brand | G06F 17/2785 |
| 9,710,142 B1 * | 7/2017 | Vendrow | H04L 65/403 |
| 9,734,410 B2 * | 8/2017 | Gottlieb | G06K 9/00308 |
| 10,061,977 B1 * | 8/2018 | Chang | G06K 9/00315 |
| 10,062,057 B2 * | 8/2018 | Kitada | H04L 65/1083 |
| 10,074,368 B2 * | 9/2018 | Ogunyoku | G10L 15/22 |
| 10,517,521 B2 * | 12/2019 | el Kaliouby | A61B 5/02055 |
| 2004/0091136 A1 | 5/2004 | Dombrowski | |
| 2004/0210472 A1 | 10/2004 | Lew et al. | |

(Continued)

OTHER PUBLICATIONS

Kroes, S. Detecting Boredom in Meetings; University of Twente: Enschede, The Netherlands, 2005 (Year: 2005).*

(Continued)

*Primary Examiner* — Scott L Jarrett

(74) *Attorney, Agent, or Firm* — Cuenot, Forsythe & Kim, LLC

(57) ABSTRACT

Obtaining feedback for an event can include receiving, using a processor, sensor data for a plurality of attendees of the event, determining, using the processor, sentiments, of the attendees, for the event from the sensor data, validating, using the processor, the sentiments of the attendees based upon a comparison of the sensor data with historical data for the plurality of attendees, and outputting, using the processor, the validated sentiments.

15 Claims, 2 Drawing Sheets

(56) References Cited

U.S. PATENT DOCUMENTS

| | | | | |
|---|---|---|---|---|
| 2005/0131744 | A1* | 6/2005 | Brown | G06Q 10/10 705/7.29 |
| 2005/0209848 | A1* | 9/2005 | Ishii | H04L 12/1831 704/231 |
| 2007/0197247 | A1* | 8/2007 | Inselberg | G06Q 30/02 455/517 |
| 2007/0271518 | A1* | 11/2007 | Tischer | H04H 60/31 715/744 |
| 2008/0255847 | A1* | 10/2008 | Moriwaki | G10L 21/06 704/270.1 |
| 2009/0088610 | A1 | 4/2009 | Lee et al. | |
| 2009/0306967 | A1 | 12/2009 | Nicolov et al. | |
| 2010/0253689 | A1* | 10/2010 | Dinicola | H04M 3/567 345/467 |
| 2011/0043602 | A1* | 2/2011 | Lee | G06F 9/543 348/14.09 |
| 2011/0112825 | A1 | 5/2011 | Bellegarda | |
| 2011/0154266 | A1* | 6/2011 | Friend | A63F 13/06 715/863 |
| 2011/0201317 | A1* | 8/2011 | Karandikar | G06Q 30/02 455/414.1 |
| 2011/0295392 | A1* | 12/2011 | Cunnington | G06Q 10/10 700/90 |
| 2012/0233633 | A1* | 9/2012 | Nishikawa | H04H 60/33 725/12 |
| 2012/0278064 | A1* | 11/2012 | Leary | G06F 17/274 704/9 |
| 2013/0019187 | A1* | 1/2013 | Hind | H04L 65/403 715/753 |
| 2013/0081056 | A1* | 3/2013 | Hu | G06F 17/30705 719/313 |
| 2013/0097245 | A1* | 4/2013 | Adarraga | H04L 65/403 709/204 |
| 2013/0124653 | A1* | 5/2013 | Vick | H04L 51/32 709/206 |
| 2013/0317873 | A1* | 11/2013 | Kozloski | G06Q 10/109 705/7.19 |
| 2014/0002573 | A1* | 1/2014 | Kim | H04N 7/147 348/14.01 |
| 2014/0006326 | A1* | 1/2014 | Bazanov | G06Q 10/103 706/46 |
| 2014/0052684 | A1* | 2/2014 | Liao | G06N 5/02 706/46 |
| 2014/0101247 | A1* | 4/2014 | Pappas | H04L 67/22 709/204 |
| 2014/0101296 | A1* | 4/2014 | Li | H04L 41/0813 709/221 |
| 2014/0162241 | A1* | 6/2014 | Morgia | G06Q 30/02 434/362 |
| 2014/0282651 | A1* | 9/2014 | Baratz | H04N 21/222 725/13 |
| 2014/0337097 | A1* | 11/2014 | Farlie | G06Q 30/0203 705/7.32 |
| 2014/0363000 | A1 | 12/2014 | Bowden et al. | |
| 2014/0366049 | A1* | 12/2014 | Lehtiniemi | H04N 21/44218 725/12 |
| 2015/0012844 | A1* | 1/2015 | Paulik | H04L 65/403 715/753 |
| 2015/0378587 | A1* | 12/2015 | Falaki | H04L 67/02 715/747 |
| 2016/0042226 | A1* | 2/2016 | Cunico | H04N 7/147 382/103 |
| 2016/0042281 | A1* | 2/2016 | Cunico | H04L 65/403 706/11 |
| 2016/0055236 | A1* | 2/2016 | Frank | G06F 17/30702 707/748 |
| 2016/0217321 | A1* | 7/2016 | Gottlieb | G06K 9/00308 |
| 2016/0270736 | A1* | 9/2016 | Chiu | A61B 5/7246 |
| 2017/0083926 | A1* | 3/2017 | Karcher | G06Q 30/0201 |
| 2017/0243303 | A1* | 8/2017 | Doddmani Manjunath | G06Q 50/01 |
| 2017/0270930 | A1* | 9/2017 | Ozmeral | G10L 17/005 |
| 2018/0053197 | A1* | 2/2018 | Chan | G06Q 30/0201 |
| 2018/0101761 | A1* | 4/2018 | Nelson | G06Q 10/00 |

OTHER PUBLICATIONS

Somasundaran, Swapna et al., Detecting Arguing and Sentiment in Meetings Proceedings of the SIGdial Workshop on Discourse and Dialogue, 2007 (Year: 2007).*

Kolsch, Mathis et al., Improving Speaking Training with Interactive Lectures EdMedia + Innovate Learning, AACE, 2003 (Year: 2003).*

Detection of Agreement vs. Disagreement in Meetings: Training with Unlabeled Data Association for Computational Linguistics, 2003 (Year: 2003).*

* cited by examiner

REAL TIME EVENT AUDIENCE SENTIMENT ANALYSIS UTILIZING BIOMETRIC DATA

BACKGROUND

This disclosure relates to the automated determination of feedback for an event from event attendees. Typically, feedback for an event such as a lecture, a presentation, a meeting, a class, etc., is obtained from surveys. Event coordinators distribute a survey to the attendees of the event. The attendees are asked to fill out the survey at some point in time after the event has ended. The event coordinators analyze the survey responses to determine relevant feedback for the event. The survey data that is collected is dependent upon numerous factors such as cooperation of attendees to provide responses to the survey, accuracy of the responses to the survey, and quality of the survey instrument.

SUMMARY

One or more embodiments are directed to methods of obtaining feedback for an event. In one aspect, a method can include receiving, using a processor, sensor data for a plurality of attendees of an event, determining, using the processor, sentiments, of the attendees, for the event from the sensor data, validating, using the processor, the sentiments of the attendees based upon a comparison of the sensor data with historical data for the plurality of attendees, and outputting, using the processor, the validated sentiments.

One or more embodiments are directed to systems for obtaining feedback for an event. In one aspect, a system includes a memory configured to store instructions and a processor coupled to the memory. In response to executing the instructions, the processor is configured to initiate operations including receiving sensor data for a plurality of attendees of the event, determining sentiments, of the attendees, for the event from the sensor data, validating the sentiments of the attendees based upon a comparison of the sensor data with historical data for the plurality of attendees, and outputting the validated sentiments.

One or more embodiments are directed to a computer program product for obtaining feedback for an event. In one aspect, the computer program product includes a computer readable storage medium having program code stored thereon. The program code is executable by a processor to initiate operations. The operations can include receiving, using the processor, sensor data for a plurality of attendees of the event, determining, using the processor, sentiments, of the attendees, for the event from the sensor data, validating, using the processor, the sentiments of the attendees based upon a comparison of the sensor data with historical data for the plurality of attendees, and generating, using the processor, a report including the validated sentiments.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
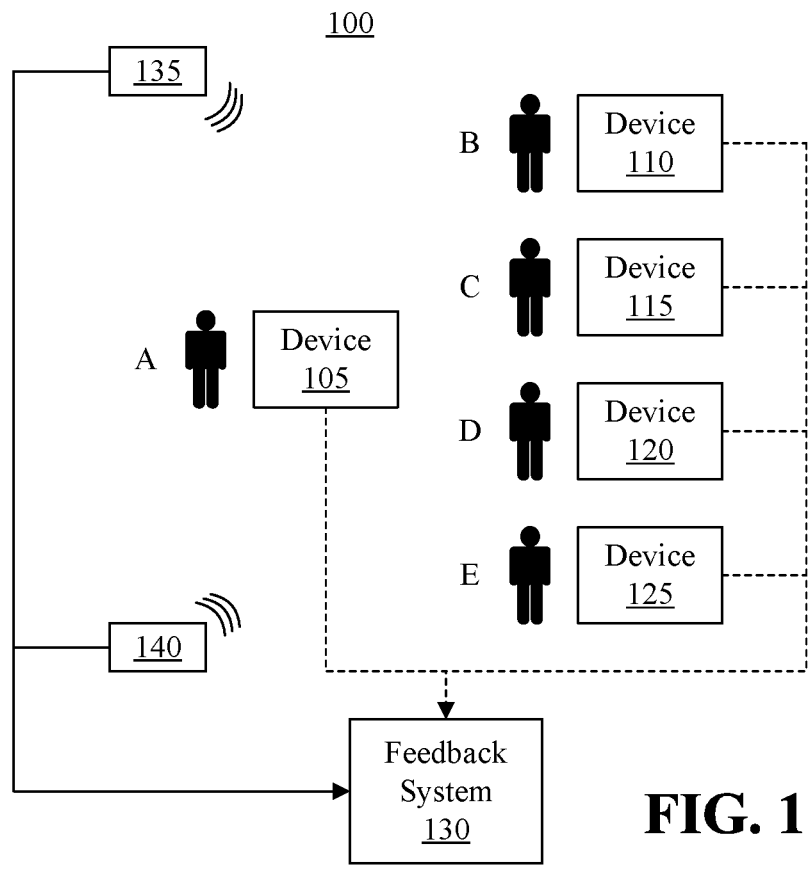
FIG. 1 illustrates an example computing environment in which the inventive arrangements may be implemented.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to the automated determination of feedback for an event. One or more embodiments described within this disclosure are directed to determining accurate sentiment for an event from attendees, e.g., audience members, of the event. In an embodiment, a system is capable of receiving data from a variety of different sources. The system may receive sensor data and/or social networking data relating to participants of the event. The received sensor data may include biometric data and/or may be analyzed to extract biometric data for participants of the event. The data may be received during, e.g., throughout, the event and/or for a predetermined period of time immediately following the event. The system is capable of analyzing the sensor data to determine sentiment of the attendees toward the event.

In one or more embodiments, the system is capable of validating sentiments of one or more of the attendees toward the event. The system is capable of validating sentiments based upon one or more different data sources. In an aspect, the system is capable of validating sentiments based upon historical data for the attendees. In another aspect, the system is capable of validating sentiments based upon context in which the sentiments are determined. In another aspect, the system is capable of validating sentiments based upon biometric data for the attendees.

In one or more embodiments, the system is capable of determining and/or validating sentiment of one or more of the attendees using social networking data. The system is capable of obtaining social networking data for an attendee of the event for the time period of the event and/or a time period immediately following the event. The system is capable of validating sentiments determined for the attendee using the obtained social networking data for the attendee. For example, the system is capable of correlating times for which sentiments are determined for an attendee with time-stamped social networking data in order to validate the sentiments using the time correlated social networking data and/or subject matter correlated social networking data. The system, for example, is capable of analyzing the social networking data using semantic analysis for purposes of sentiment determination and/or validation.

In one or more embodiments, the system is capable of outputting the determined sentiment data as feedback for the event. For example, the system is capable of generating a report that may be provided to one or more selected users such as event coordinators, the speaker or presenter of the event, etc. The system is capable of generating a report that summarizes the determined sentiment from one or more or all of the attendees. The system may include validating information for the sentiments within the report.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing environment 100 in which the inventive arrangements may be implemented. In the example of FIG. 1, an event takes place involving users A, B, C, D, and E. The event may be a lecture, a meeting, a class, a conference, a presentation, and so forth. As an illustrative example, a lecture may take place within a conference room or another indoor venue with seating, etc. Users A, B, C, D, and E are participants in the event. For purposes of illustration, user A is considered a presenter or lecturer. For example, user A may be the designated speaker of the event delivering a presentation or other information to users B, C, D, and E. Users B, C, D, and E are audience members and considered attendees of the event. User A may speak while presenting other materials such as slides, audio-visual material, performing a software demonstration, etc.

In the example of FIG. 1, users A, B, C, D, and E have devices 105, 110, 115, 120, and 125, respectively. While each participant in the event is shown to have a device, it should be appreciated that each participant need not have a device. FIG. 1 is provided for purposes of illustration and not limitation. In an embodiment, devices 105, 110, 115, 120, and 125 are equipped with one or more sensors. Examples of sensors include, but are not limited to, cameras, microphones, accelerometers, gyroscopes, compasses (e.g., electronic), location detection systems (e.g., global positioning systems, wireless transceivers), heart rate sensors, and so forth.

The sensors are configured to generate sensor data. Examples of sensor data can include, but are not limited to, audio data (e.g., recorded audio), image data (referring to images and/or video), location data, motion data, and/or biometric data. An example of biometric data is heart rate data as determined by a heart rate sensor. Other examples of biometric data may be determined or extracted from audio data and/or image data. For example, biometric data may include facial feature data as determined from image processing performed on the image data, speech and/or voice related features and/or content as determined from audio data, and so forth.

As an illustrative example, devices 105-125 may be mobile devices such as smart phones, tablet computers, portable computers, etc., equipped with one or more or all of the aforementioned sensors. Further, device 110 may be implemented as one type of device, while device 115 is implemented as another different type of device, while device 120 is implemented as yet another different type of device, etc.

In one or more embodiments, one or more of devices 105-125 may be a wearable device that includes one or more sensors. For example, one or more of devices 105-125 may be a fitness tracking device, a smart watch, etc. Such devices are capable of generating one or more different types of the sensor data described and may operate as a standalone device or as a peripheral of another device such as a mobile device or smart phone.

In one or more embodiments, one or more additional devices 135 and/or 140 may be used. Devices 135 and/or 140 are referred to as venue devices as devices 135 and 140 are not specific to a particular user. For example, devices 135 and/or 140 may be sensors such as microphones, video cameras, etc. that are mounted or fixed within the venue in which the event is taking place. Thus, while devices 105-125 are personal devices of the attendees (e.g., are user-specific devices also referred to "participant devices" herein), devices 135 and/or 140 may be general devices configured to collect sensor data of users within and/or of the venue in general while the event takes place and/or for a period of time immediately after. The sensor data collected by devices 135 and/or 140 may include image data, audio data (e.g., including participant speech), etc.

In an embodiment, devices 105-125 may execute an application that is configured to collect sensor data as described herein. Users A, B, C, D, and E, for example, may provide permission for the application executing in each respective device to collect sensor data and provide the sensor data to a feedback system 130. In an aspect, the permission may be limited to the duration of the event and/or the period of time immediately following the event. Devices 105-125, 135, and 140 may provide collected sensor data to feedback system 130 via wired and/or wireless communications links whether via a network or using peer-to-peer communication links.

In an embodiment, devices 105-125 are configured to provide social networking data to feedback system 130. For example, users A, B, C, D, and/or E may provide permission for the application executing therein to access and/or share social networking data for the user with feedback system 130 for the duration of the event and/or for the period of time immediately following the event. In another embodiment, users A, B, C, D, and/or E may provide the application with permission to access and/or share the user's credentials for one or more social networking platforms with feedback system 130. In that case, feedback system 130 is capable of receiving the credentials of users A, B, C, D, and/or E and retrieving social networking data for users A, B, C, D, and/or E from one or more social networking platforms for the duration of the event and/or the period of time immediately following the event.

A "social networking platform" refers to a computing platform formed of one or more interconnected computer systems or servers that allows users to build social networks or social relations among people who share similar interests, activities, backgrounds or real-life connections. Through a social networking platform, users may send communications through different mechanisms such as by posting messages or other media, commenting on messages, posts, or other media, replying to messages, and performing other operations such as "liking" a communication or item of media, sharing the communication or item of media, expressing an emotional sentiment, and so forth. In the context of a social networking platform, actions such as posting, replying, liking, sharing, expressing sentiment, and so forth are programmatic actions that are monitored and persisted within social the networking system, e.g., within a data storage device in a data structure within and/or accessible by, the social networking platform. These actions are examples of social networking data.

Feedback system 130 is a data processing system that is configured to receive sensor data from devices 105-125, 135, and 140. As noted, feedback system 130 is also capable of receiving social networking data for the attendees. Feedback system 130 is capable of storing received data from the various devices and/or sources with timestamps (e.g., a time and/or date). Feedback system 130 is capable of correlating the timestamp information of the received data with timing of the event and/or the period of time immediately following the event. Feedback system 130 is capable of analyzing the data (e.g., sensor data and/or social networking data), whether collected during the event or in the time period immediately following the event.

For example, in analyzing the received sensor data, feedback system 130 is capable of determining the source of the received data, e.g., the particular participant from which the data is received. Further, to the extent that the data is audio and/or video, feedback system 130 is capable of using facial recognition technology, speech recognition, voice analysis, natural language processing, etc., to process the received data. Feedback system 130 is further capable of using location sensor data for the attendees to determine which attendees may be speaking and/or gesturing within captured audio data and/or image data that is analyzed.

Feedback system 130 is also capable of performing sentiment analysis on the sensor data and/or the social networking data for the attendees (e.g., users B, C, D, and E) for the event. Sentiment analysis refers to the use of various computer processes such as natural language processing, text analysis, computational linguistics, biometrics, etc., to systematically identify, extract, quantify, and study affective states and subjective information. In general, sentiment analysis is directed at determining attitudes users, e.g., attendees in this case, with respect to the event. The attitude may be a judgment or evaluation, affective state, etc.

FIG. 1 is provided for purposes of illustration and is not intended to limit the inventive arrangements described herein. It should be appreciated that computing environment 100 may include fewer elements than shown or more elements than shown. For example, computing environment 100 may include additional participants and/or devices, fewer participants and/or devices, and different varieties of sensors configured to generate sensor data.

Figure 2:
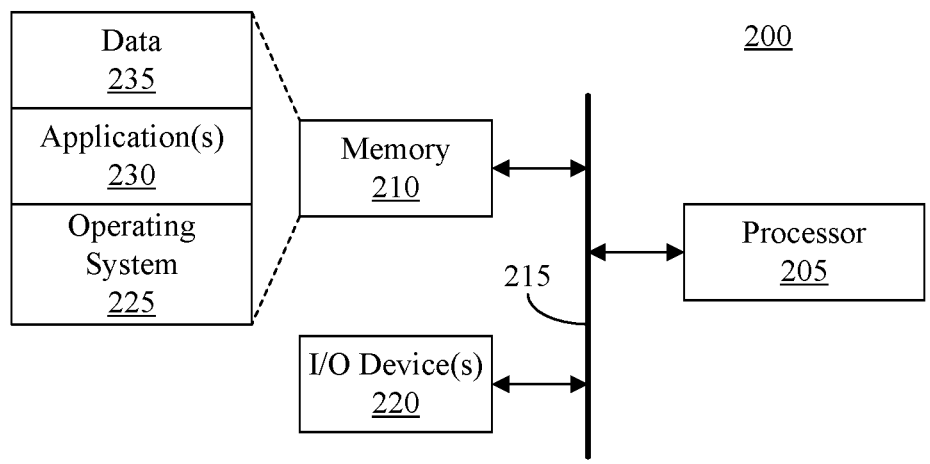
FIG. 2 illustrates an example data processing system.

FIG. 2 illustrates an example data processing system (system) 200. In one or more embodiments, system 200 or another system similar to system 200 may be used to implement feedback system 130 described in connection with FIG. 1. System 200 can be implemented as a computer or other system or device that is suitable for storing and/or executing program code.

In the example of FIG. 2, system 200 includes at least one processor 205. Processor 205 is a hardware processor. In one example, processor 205 is a hardware circuit configured to carry out instructions (e.g., computer readable instructions or "program code"). For example, the hardware circuit may be an integrated circuit. Examples of processor 205 can include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processor 205 is coupled to memory 210 through interface circuitry 215. System 200 stores instructions within memory 210. Memory 210 may be considered an example of computer readable storage media. Processor 205 executes the instructions accessed from memory 210 via interface circuitry 215.

Memory 210 includes one or more physical memory devices such as, for example, a local memory and one or more bulk storage devices. The term "local memory" refers to random access memory (RAM) or other non-persistent memory device(s) generally used during actual execution of the program code. The term "bulk storage device" refers to persistent data storage devices such as a hard disk drive (HDD), a solid state drive (SSD), etc. System 200 may also include one or more cache memories (not shown) that provide temporary storage of at least some program code in order to reduce the number of times program code must be retrieved from a bulk storage device during execution.

Memory 210 stores one or more program modules. The program modules may generally include routines, programs, objects, components, logic, data structures, and so on. For purposes of illustration, memory 210 stores an operating system 225, one or more application(s) 230, and data 235. Data 235 may include sensor data, social networking data, and the various other types of data described within this disclosure. In an aspect, operating system 225 and application(s) 230, being implemented in the form of executable program code, are executed by system 200 and, more particularly, by processor 205, to perform the operations described within this disclosure. As such, operating system 225 and application(s) 230 may be considered an integrated part of system 200. Further, it should be appreciated that any data used, generated, and/or operated upon by system 200 (e.g., processor 205) are functional data structures that impart functionality when employed as part of system 200.

Examples of interface circuitry 215 include, but are not limited to, an input/output (I/O) subsystem, an I/O interface, a bus system, a memory interface, etc. For example, interface circuitry 215 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 200 further may include one or more input/output (I/O) devices 220 coupled to interface circuitry 215. I/O devices 220 may be coupled to system 200, e.g., interface circuitry 215, either directly or through intervening I/O controllers. Examples of I/O devices 220 include, but are not limited to, a keyboard, a display device, a pointing device, one or more communication ports, a network adapter, etc. A network adapter refers to circuitry that enables system 200 to become coupled to other systems, computer systems, remote printers, and/or remote storage devices through intervening private or public networks. Modems, cable modems, Ethernet cards, and wireless transceivers are examples of different types of network adapters that may be used with system 200.

System 200 may include fewer components than shown or additional components not illustrated in FIG. 2 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

Figure 3:
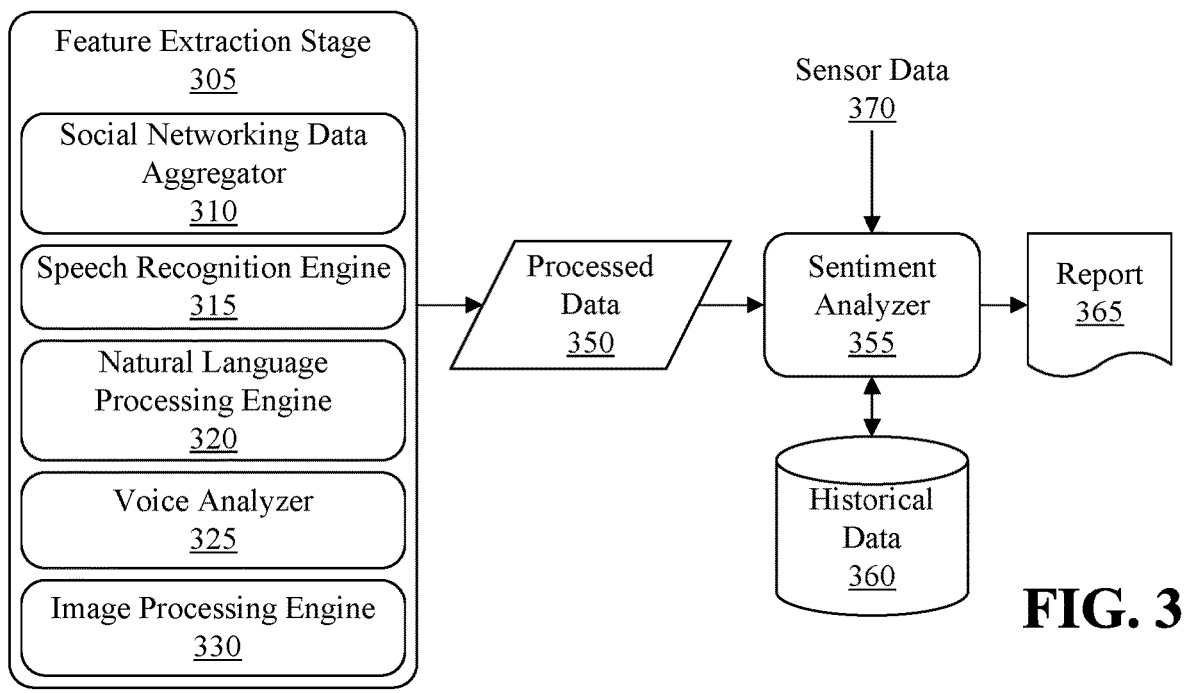
FIG. 3 illustrates an example software architecture executed by the feedback system of FIG. 1.

FIG. 3 illustrates an example software architecture executed by the feedback system (system) 130 of FIG. 1. As noted, system 130 may be implemented as a data processing system described in connection with FIG. 2. In another aspect, system 130 may be implemented as a plurality of networked data processing systems. In either case, system 130 may execute the architecture illustrated in FIG. 3. In the example of FIG. 3, the software architecture includes a feature extraction stage 305. Feature extraction stage 305 includes a social networking data aggregator (aggregator) 310, a speech recognition engine (SRE) 315, a natural language processing (NLP) engine 320, a voice analyzer 325, and an image processing engine 330.

In an embodiment, sensor data and/or social networking data received from devices is processed through feature extraction stage 305. For example, as discussed, the participant devices may be configured to provide social networking data to system 130. In such an arrangement, the received social networking data may be routed to NLP engine 320 for processing. The social networking data, for example, may be in text form and, as such, semantically processed by NLP engine 320.

In another embodiment, aggregator 310 is configured to retrieve social networking data from one or more social networking platforms as previously described. Aggregator 310, for example, is capable of using credentials for attendees, as provided with permission of the attendees through the respective attendee devices, to retrieve social networking data for the attendees from one or more social networking platforms. In that case, aggregator 310 may provide retrieved social networking data to NLP engine 320 for semantic processing.

SRE 315 is configured to convert participant speech, e.g., user spoken utterances, to text. For example, SRE 315 is configured to receive audio data from participant devices and/or venue devices. SRE 315 is capable of converting user spoken utterances recorded in the audio data into text. In one or more embodiments, SRE 315 provides the speech recognized text to NLP engine 320 for semantic processing. SRE 315 is capable of outputting the speech recognized text as processed data 350. SRE 315 is further capable of providing the speech recognized data to NLP engine 320 for semantic processing.

NLP engine 320 is configured to perform natural language processing (NLP) on received text inputs. NLP engine 320 is capable of processing social networking data, speech recognized text, etc. NLP is a field of computer science, artificial intelligence, and computational linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, and dependency. NLP engine 320 is capable of outputting results of processing as processed data 350.

Voice analyzer 325 is configured to determine or extract various features (e.g., characteristics) of voices and/or speech included in the audio data. The features or characteristics extracted by voice analyzer 325 are examples of biometric data. Examples of features (e.g., voice features) that voice analyzer 325 may extract from user speech recorded in the audio data can include, but are not limited to, frequency (e.g., spectral analysis) of speech, dominant frequency of speech, intensity, Mel Frequency Cepstral Coefficients (MFCCs), prosody, time domain analysis, frequency domain analysis, and other varieties of voice features and/or audio characteristics. Voice analyzer 325 is also capable of recognize human speech and/or human voices within the audio data and performing speaker recognition and/or speaker verification. For example, voice analyzer 325 is capable of recognizing voices and/or speech within audio data and determining the identity of the participant that is speaking within the audio data at any given time. Voice analyzer is capable of outputting results as processed data 350.

Image processing engine 330 is configured to analyze image (e.g., images and/or video) data. In an embodiment, image processing engine 330 is configured to detect facial features and/or expressions from within the image data. In an aspect, image processing engine 330 is capable of using the recognized facial features to perform facial recognition to determine the identity of participants captured in the image data. The facial features determined by image processing engine 330 are further examples of biometric information. For example, image processing engine 330 is capable of recognizing facial features of a user and determining changes in facial features over time. In this manner, image processing engine 330 is capable of determining whether a particular participant is smiling, frowning, furrowing a brow, or has an expression indicating interest, disinterest, etc.

In another aspect, image processing engine 330 is capable of recognizing particular gestures and/or mannerisms performed by a participant. For example, image processing engine 330 is capable of detecting gestures such as the shrugging of shoulders, or other body motions and/or movements beyond detection of facial features and/or movement of facial features.

In another aspect, image processing engine 330 is configured to perform gaze detection. For example, image processing engine 330 is capable of detecting eye(s) within detected faces in the image data and analyzing the eyes, e.g., the pupils, to determine the direction that the participant is looking and/or point (e.g., location) in space at which the participant is looking. This process is referred to as gaze detection. Image processing engine 330 is capable of outputting results as processed data 350.

In one or more embodiments, the data, e.g., sensor data and/or social networking data, analyzed by feature extraction stage 105 is timestamped. As such, system 130 is capable of attributing or correlating the analyzed data and any further data, e.g., features, derived from the sensor data and/or social networking data output as processed data 350 with particular times during the event and/or particular times during the period of time immediately following the event. Further, the received social networking data and is attributed to particular attendees based upon the providing device and/or the credentials utilized to retrieve the social networking data. Similarly, system 130 is capable of attributing features determined within processed data 350 to particular participants based upon voice identification, facial recognition, and/or location data for participants.

Processed data 350 may be stored in a data storage device (not shown). In this regard, unprocessed sensor data and/or social networking data may also be stored in a data storage device whether the same or different from the data storage device used to store processed data 350. Sentiment analyzer 355 is configured to access processed data 350 and analyze processed data 350 to perform further sentiment analysis for attendees of the event.

In one or more embodiments, sentiment analyzer 355 is capable of receiving particular types of data directly, e.g., sensor data 370. In one example, sensor data 370 may include particular types of sensor data that do not require processing by feature extraction stage 305. As an illustrative example, certain types of biometric data for participants such as heart rate may be received as sensor data 370 from participant devices during the event. Sensor data 370 is also timestamped thereby allowing sentiment analyzer 355 to correlate sensor data 370 with processed data 350 in time.

In general, sentiment analyzer 355 is capable of aggregating processed data 350 and sensor data 370 generating a time-aligned chronology of processed data 350 and sensor data 370. Sentiment analyzer 355 is capable of determining sentiments expressed by attendees of the event, e.g., sentiments expressed through speech and/or biometric data.

As pictured, sentiment analyzer 355 is also capable of accessing historical data 360. In an embodiment, sentiment analyzer 355 is capable of validating any sentiments determined from processed data 350 and/or sensor data 370 against historical data 360. Historical data 360 may include prior sentiments determined for the attendees. The sentiments in historical data 360 may also include, or be associated with, the sensor data used to determine the sentiment, social networking data used to determine and/or validate the sentiment, and/or other features such as biometric data used to determine and/or validate the sentiment.

As an illustrative and non-limiting example, sentiment analyzer 355 is capable of evaluating a positive sentiment expressed by user B such as "I liked the presentation" by comparing voice features, facial features, heart rate data, etc. against historical data 360, which may include historical voice feature data, facial feature data, heart rate data for user B from prior situations where user B expressed positive sentiment.

In an embodiment, in validating sentiments, sentiment analyzer 355 is capable of generating a confidence score for sentiments determined for an event. The confidence score specifies the likelihood or a degree of certainty that the sentiment determination(s) are accurate. Confidence scores are generally expressed as a value between 0 and 1, though it should be appreciated that confidence scores may be specified using any of a variety of different scales.

Sentiment analyzer 355 is capable of outputting sentiments determined from processed data 350 and/or sensor data 370 along with validation information for the sentiments as a report 365. In an aspect, report 365 may list each determined sentiment. Report 365 may specify a confidence score for each sentiment. Sentiment analyzer 355 is capable of including the particular attendee to which each sentiment is attributable. In another example, sentiment analyzer 355 is capable of outputting a summary as report 365. The summary may indicate categories of sentiment and the percentage or number of attendees that expressed the sentiment. As an illustrative and non-limiting example, the summary may state that "50% of the attendees felt that the pace of the presentation was too fast".

Sentiment analyzer 355 is capable of performing further analysis with regard to social networking data. For example, sentiment analyzer 355 is capable of determining sentiments from social networking data. In one example, sentiment analyzer 355 is capable of determining whether items of social networking data that are timestamped during the event and/or within the period of time following the event are discussing the event. For example, sentiment analyzer 355 may determine that items of social networking data relate or are discussing the event based upon semantic analysis of the social networking data performed by NLP engine 320. In one example, where an item of social networking data is discussing the event, sentiment analyzer 355 is capable of obtaining sentiment directly from the social networking data items. For example, if the item of social networking data is a "like," the item is determined to be positive sentiment for the event and/or speaker. In other cases, the semantic analysis is used to determine positivity, negativity, or other sentiment.

In the case where an item of social networking data having a timestamp during the event and/or during the period of time immediately following the event is determined to be unrelated to the event, e.g., per the semantic analysis performed by NLP engine 320, sentiment analyzer 355 is capable of interpreting the item of social networking data a negative sentiment. The existence of a social networking data item unrelated to the event that is timestamped during the event and/or during the time period following the event indicates disinterest of the attendee to which the social networking data item is attributed.

Figure 4:
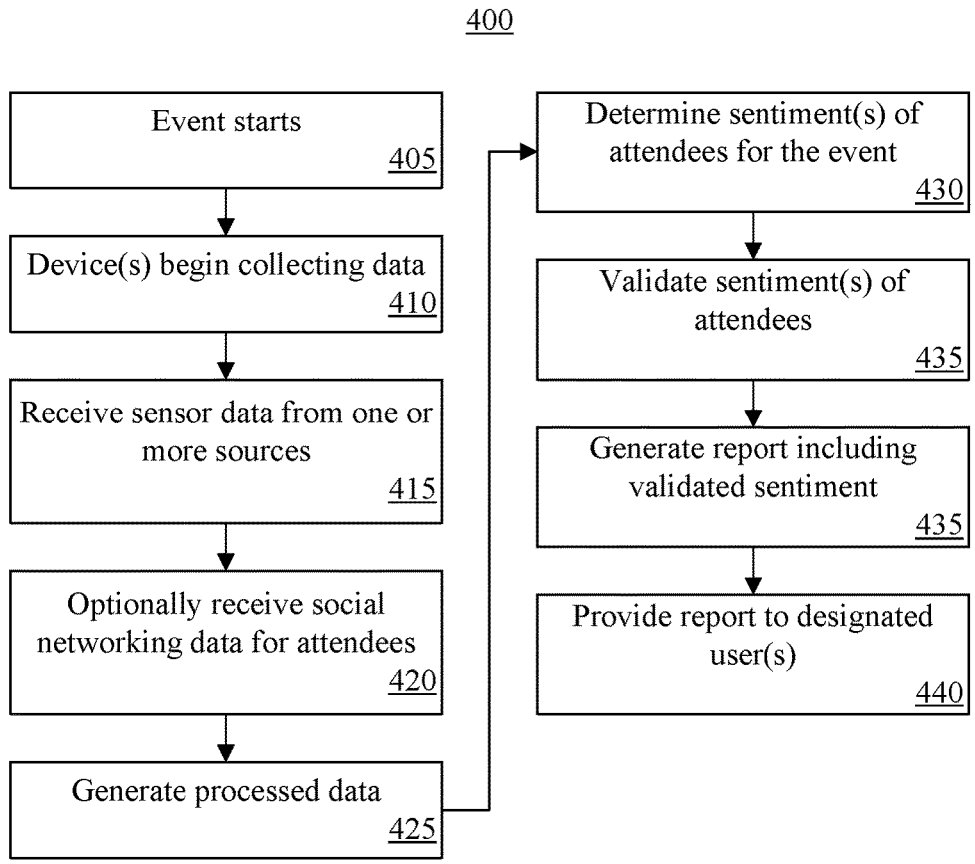
FIG. 4 illustrates an example method of determining feedback for an event.

FIG. 4 illustrates an example method 400 of determining feedback for an event. Method 400 may be performed using the system described in connection with FIGS. 1-3 or another system similar thereto. Method 400 may begin in a state where participant devices are configured to share data with the feedback system (system). Further, one or more venue devices and/or sensors may be configured to share or send sensor data to the system.

In block 405, the event starts. For example, a meeting may start, a presenter may begin speaking and presenting slides or other materials to one or more attendees of the event, etc. In block 410, the devices begin collecting data. For example, participant devices and venue devices may begin collecting sensor data and/or social networking data. In one or more embodiments, the participants can initiate and stop data collection on their respective devices manually. Similarly, an event coordinator and/or the speaker may initiate data collection on the venue devices. In another aspect, the participant devices and/or venue devices may be configured to start collecting data at a particular time and stop collecting data at a particular time.

As discussed, the various devices may collect data throughout the event and/or for a period of time immediately following the event. For example, the devices may continue to collect data for a period of time such as 5, 10, 15, 20, 25, or 30 minutes immediately following the end of the event. In another example, devices may continue to collect data until the event venue is empty, until a participant exits the venue (where the device of that participant stops collecting data), etc. In many cases, participants linger in the area of the event and discuss aspects of the event. Thus, continuing to collect sensor data and/or social networking data for a period of time following the event can be advantageous.

In an embodiment, one or more or all of the devices may be configured to collect data only responsive to particular detected events. For example, the devices may monitor audio and store the audio data in response to detecting a keyword or words that are related to the event. For example, a participant device may monitor audio and only persist audio data, e.g., store audio data for purposes of analysis as described herein, in response to detecting particular key-words. Otherwise, the participant device may discard the audio data. In that case, for example, the participant device can perform a semantic analysis, e.g., a limited analysis, locally and begin collecting data, e.g., sensor data, in response to the detected event.

In block 415, the system receives sensor data from the devices. The participant devices and/or venue devices, for example, can send the collected sensor data to the system. For example, venue devices can transmit sensor data such as audio data and image data, which may be received by the system. Participant devices can transmit sensor data such as audio data, image data, and other biometric data such as location information, heart rate, and the like, which may be received by the system. In an aspect, the participant devices include the device of the presenter. Thus, the system may also receive sensor data from the device of the presenter.

In block 420, the system optionally receives social networking data for the attendees. In an embodiment, participant devices are capable of accessing social networking data stored on the device and/or from a social networking platform of which the participant is a member and sending the social networking data to the system. In another embodiment, the system is capable of utilizing credentials provided by the participant devices to obtain social networking data for the attendee(s).

In block 425, the system is capable of generating processed data. The processed data may be correlated in time. The processes data may also be correlated with respect to participants. For example, the system is capable of processing image data to perform participant recognition (e.g., determine participant identities), determine facial features of participants, etc. The system is capable of processing audio data to transform user speech to text. The system is capable of performing voice analysis to determine audio features of the speech, recognize particular voices within the audio data, etc.

In an aspect, the system is capable of correlating the processed data in time so that the various features determined from the image data and the audio data are time aligned. Social networking data may also be time aligned with the processed data. Accordingly, the processed data may be organized in chronological order and include annotations attributing particular text, facial features, voice features, etc. to particular participants. It should be appreciated that the analysis performed may include analysis of the presenter. For example, audio and/or image data may be analyzed to convert speech of the presenter to text, recognize facial features of the presenter, monitor heart rate of the presenter, etc. Thus, reactions in the audience may be correlated with the content or speech of the presenter.

In block 430, the system determines sentiment(s) of attendees for the event from the processed data. As discussed, the system is also capable of receiving other sensor data that may be used. In an embodiment, the system is capable of determining sentiments from the speech recognized text. As discussed, the processed data may include semantically processed text. Thus, the system is capable of determining particular statements relating to the event and whether such statements are positive or negative.

In an embodiment, the system is capable of determining sentiments directly from social networking data. For example, the system is capable of identifying those items of social networking data that relate to the event. Thus, the system, through semantic analysis, is capable of identifying posts, messages, etc., from social networking data for attendees that relate to the event. The system determines the sentiment expressed within the social networking data.

In an embodiment, the system is capable of determining sentiment based upon biometric data. As an illustrative example, during the event, the system may determine that an attendee's gaze is not directed toward the presenter or the presentation screen. In that case, the system may determine that sentiment for the attendee, at least at that moment, indicates disinterest in the event.

It should be appreciated that each of the sentiments determined for a particular attendee can be associated with a particular time. In an embodiment, the time of a sentiment is the time or time period of the underlying sensor data and/or social networking data that is used to determine the sentiment. For example, a sentiment derived from speech recognized text occurring at 3:35 PM is assigned the time of 3:35 PM. Further, as noted, the sentiment is attributed to the particular attendee that made the statement or for whom biometric data is being interpreted.

In an embodiment, the sentiment determination process may also include a contextual analysis for the sentiments that are determined. Consider an example where a group of attendees are discussing the presentation following the event. The system may detect the identity of the attendees in the group through the various mechanisms described herein. A selected attendee of the group may exhibit biometrics that differ from the biometrics of one or more of the other attendees in the group for the time period corresponding to the discussion. The system is capable of performing a contextual analysis to determine whether the detected change in biometrics is attributable to sentiment expressed (or lack thereof) of the selected attendee for the event or is due to other factors that are independent of the event.

As an illustrative example, the selected attendee may exhibit an increase in heart rate. The increase in heart rate may be due to the attendee receiving a message such as an electronic mail, an instant message, or the like. The device of the attendee may indicate the receipt of a message at that time. Such information may be provided without providing content or other confidential information relating to the message. In that case the system may attribute the rise in heart rate to the received message as opposed to being indicative of sentiment relating to the event. In another example, gaze analysis may reveal that the selected attendee is looking in a direction other than the group or the attendee in the group that is speaking thereby indicating that the attendee's attention is not focused on the discussion. In that case, the system may attribute the rise in heart rate to the observance of something unrelated to the event or the discussion taking place in the group.

In the absence of any alternative causes from the contextual analysis, the increase in heart rate, e.g., the change in biometric data, which differs from that of the other attendees in the group, may be used by the system in a variety of ways. In one example, the system is capable of utilizing the biometric data to perform modify the sentiment determined for the attendee, e.g., by increasing or decreasing the intensity of the sentiment, changing the sentiment entirely, and/or to validate the sentiment. For instance, regarding validation, the system may increase or decrease the confidence score for sentiment attributed to the selected attendee based upon the detected change or difference in biometric data compared to the other attendees. In illustration, an increase in heart rate may be attributed to disagreement of the selected attendee with sentiments being expressed by the other attendees in the group at that time, excitement, and so forth.

In an embodiment, the system is capable of determining that biometric data of an attendee that does not match biometric data of others in a group, e.g., while a discussion is taking place following the event, indicates that the attendee with the mismatched biometrics was not taking part in the conversation. In that case, any sentiments determined for the attendee for that time or time period may be disregarded or ignored.

In an embodiment, the system is capable of performing contextual analysis by correlating speech, speech recognized text, biometric data, etc. of the presenter with sentiment determined for attendees. As an illustrative example, a particular presentation technique or style, e.g., a gesture, an attempt at humor (joke), etc., used by the presenter that occurs at a particular time during the event can be correlated with sentiment of the attendees at or about the same time as the technique or style was used. In this manner, the presenter may be informed as to whether the presentation technique or style was successful or effective based upon the sentiment determined from the attendees (e.g., where positive indicates success). Through facial feature analysis, voice processing, speech recognition, etc., for example, chuckles, eye rolling, heart rate, gestures such as stretching, etc. of attendees can be correlated with the time the technique was used during the presentation to determine whether the technique was effective. For example, the system may determine whether laughter was detected, likelihood that laughter was genuine vs. feigned, whether audience members reacted, whether reactions were positive or negative, etc.

In block 435, the system is capable of validating sentiments of attendees determined in block 430. In an embodiment, the system is capable of validating a sentiment determined in block 430 with historical data. For example, the system is capable of comparing current sentiments for the attendees with past, e.g., historical sentiments, expressed by the attendees for other events, presentations, etc. As discussed, since each sentiment is timestamped and attributed to a particular attendee, any biometric data determined for the attendee for the same time as the sentiment may be recalled. The recalled biometric information may be compared with historical data for the attendee in order to validate the sentiment. In an aspect, the validation includes generating a confidence score indicating how closely the recalled data matches the historical data for the attendee.

In an embodiment, the system is capable of using historical social networking data to validate sentiments. As an illustrative example, an attendee may have a history of posting messages about events on social networking platforms. In this case, the system may determine that the attendee expressed positive sentiment, e.g., via semantic analysis of speech recognized text, but did not post a message about the event on a social networking platform whether during the event or for the period of time after the event. In that case, the system is capable of generating a confidence score for the positive sentiment that is lower due to the lack of posting by the attendee, e.g., due to the variation in current behavior of the attendee compared to past behavior.

In another example, during the period of time following the event, a group of attendees may be discussing the presentation. Several of the attendees of the group may state that the presentation was very good. Another attendee within the group, however, may be silent. The system may detect the identities of the participants in the group using the techniques described herein. In this example, silence of the attendee in the group, particularly when that attendee has a history of discussing post presentation (or event) may result in a confidence score for sentiment determined for the attendees of the group and/or the silent user being lower than would be the case had the silent attendee engaged in the discussion.

As discussed, sentiment may be determined from biometric data for an attendee. The system is capable of detecting eye rolling of an attendee or other gestures that are correlated with, or indicative of, positive or negative sentiment. During validation, the system is capable of comparing the detected biometrics with the historical data for the attendees. As an illustrative example, the system may detect eye rolling on the part of an attendee and attribute the eye rolling with negative sentiment. During validation, the system may determine that the attendee has a history of eye rolling. In that case, the system may calculate the confidence score differently. The system, for example, may lower the confidence score of the negative sentiment since eye rolling may not be an action that is always indicative of discontent for that particular attendee. In another example, the system is capable of determining that eye rolling is a false positive (false indicator of negative sentiment) for the attendee based upon the historical data for the attendee. In another example, the system may reduce the amount of negativity (or positivity depending upon the particular biometric data being analyzed) of the sentiment for the attendee in response to determining that the attendee has a history of the particular gesture or other biometric data that is detected.

In block 435, the system is capable of generating and outputting a report. The report may be generated to include any of a variety of different levels of detail from individual sentiments, to groupings or summaries of sentiments, etc. The report may include a timeline showing sentiment throughout the presentation and/or throughout the period of time following the presentation. In another example, the system is capable of aggregating the sentiments as a percentage of the discussion engaged in by the attendees, e.g., following the event. In an aspect, confidence scores determined during validation can be included in the report whether provided for each sentiment, aggregated, averaged, etc.

In block 440, the system is capable of providing the report to one or more selected users. In an embodiment, the system provides the report to the presenter. The report may be used by the presenter to improve the presentation, etc.

In one aspect, method 400 may be performed in real time, where data received by the system is continually analyzed for sentiments. The system is capable of collecting and analyzing data throughout the presentation in order to provide real-time feedback to the presenter. In that case, the system may provide ongoing feedback or reports indicating sentiment determined from the attendees as the sentiment data becomes available using the real time processing described.

In another aspect, method 400 may be performed to collect data in real time and perform processing during the event, following the event, at the conclusion of data collection, or any combination thereof.

For purposes of illustration, consider an example use case where a presenter (user A) is delivering a presentation to an audience including users B, C, D, and E. User A may ask the audience to accept a user agreement thereby granting permission for collection of data via mobile devices, wearable devices, etc. Acceptance may be provided through each participant device, e.g., using the application executing thereon. In addition, user A has prior permission to use venue devices such as cameras and/or microphones to collect sensor data. The various user devices and venue devices are configured to collect data during the presentation as well as for a predefined period of time immediately following the presentation.

After the presentation, e.g., within the predetermined period of time immediately following the end of the presentation or event, users B, C, D and E congregate and start discussing the presentation. User B mentions user A by name. The system is capable of recognizing the mention of user A's name thereby triggering further data collection and/or analysis as described. In this example, the system speech recognizes user C's comments that user A's pace was slow throughout the presentation. The system further speech recognizes verbal agreement from user E. The system speech recognizes user B's comment that the presentation was informative. User D is silent, e.g., is not speaking during the discussion, and does not provide any verbal feedback. User D only listens to the discussion.

The system is capable of correlating sentiments during the conversation to each of the respective users. The system is capable of comparing the sentiments of the respective users to the historical data of each respective user. For example, the system determines that user C's sentiment is negative through semantic analysis. The system compares aspects of user C's comment such as tone, speed of speech, prosody, and other biometric data (e.g., voice features, facial features, heart rate, etc.) with historical data for user C. For example, the system compares the biometric data of the current sentiment with biometric data for prior negative comments and determines that the biometric data for the current sentiment correlates (e.g., matches or is similar) to the historical biometric data for negative sentiments for user C. The system, based upon the comparison, from which a correlation is found, classifies the sentiment as having a high confidence level (e.g., for accuracy). The confidence level may be expressed as a confidence score as described.

The system determines that user B's comment is positive. The system compares biometric data of user B's comment with historical data for user B. For example, the system compares the biometric data derived from the comment of user B and/or biometric data of user B that coincides with the time of the comment from user B with historical biometric data for user B for positive comments. The system, based upon the comparison, from which a correlation is found, classifies the sentiment has having a high confidence level.

In the case of user D, the system determines that heart rate for user D is elevated during the time of user B's comment and feedback. In response to detecting increased heart rate from user D during the time of user B's comment, the system determines agreement of user D with user B despite user D remaining silent during the conversation. As such, the system is capable of determining sentiment attributable to user D without relying upon speech or voice analysis for user D. In this example, the system determines sentiment for user D based upon biometric data for user D reacting to sentiment expressed by another, different user.

In the case of user E, the system is capable of determining that biometric data for user E does not correlate with user E's historical data. Recall that user E expressed agreement with the negative sentiment expressed by user C. In this example, while agreeing with the negative sentiment, the system determines that the biometric data for user E does not correlate with historic biometric data of user E for negative sentiment. Accordingly, in this example, the system is capable of ignoring the sentiment expressed by user E.

The system is capable of generating a report that may be output and provided to user A. For example, the system aggregates the sentiments as a summary and can provide sentiments in terms of percentages of the discussion. For example, the report may indicate that 25% of the attendees felt that the presentation was slow with a high confidence level while another 25% of attendees agreed with a lower confidence level. The report can also indicate that the remaining 50% of attendees felt that the presentation was informative with a high confidence level. The report may express confidence levels and/or percentages in any of a variety of formats whether as text, charts, scales, etc.

In another embodiment, the system is capable of evaluating and categorizing historical data (e.g., historical sentiment data) based on the type of event. For example, the system may categorize the historical data based upon type of presentation and include the historical data within the presentation type as categorized. The categorization accounts for aspects of an event that may be inherent to particular event types.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like. As defined herein, the term "real time" means a level of processing responsiveness that a user or system senses as sufficiently immediate for a particular process or determination to be made, or that enables the processor to keep up with some external process. The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method by a computer hardware feedback system including a hardware processor, of obtaining feedback for an event, comprising:

receiving, by the computer hardware feedback system in real-time and during the event, biometric sensor data generated by separate computer devices respectively associated with each of a plurality of attendees of the event and transmitted to the computer hardware feedback system over a communications link;

automatically performing, in real-time and during the event, a sentiment analysis, using a sentiment analyzer executing on the hardware processor, on the received biometric sensor data to determine sentiments, of the attendees, for the event;

comparing, by the sentiment analyzer and during the event, the determined sentiments to previously-stored historical biometric data for the plurality of attendees to validate the determined sentiments of the attendees, wherein the comparing includes a selected sentiment of a first attendee being validated by the computer hardware feedback system based upon a comparison of biometric sensor data for the first attendee for a period of time with biometric sensor data for a second attendee for the period of time; and outputting, by the computer hardware feedback system in real-time and during the event to a graphical user interface of a hardware device associated with the presenter, the validated sentiments of the attendees as processed computer data.

2. The method of claim 1, wherein
the comparing includes retrieving social networking data timestamped during the event, and
a selected sentiment of a first attendee is validated based upon the social networking data for the first attendee.

3. The method of claim 1, wherein
the sentiment analyzer aggregates the processed data and the biometric sensor data to generate a time-aligned of the processed data and the biometric sensor data.

4. The method of claim 1, wherein
the biometric sensor data for a particular attendee is collected conditioned upon receiving, via an application executing within a computer device associated with the particular attendee.

5. The method of claim 1, wherein
the biometric sensor data includes heart rate data for the at least one attendee.

6. The method of claim 1, wherein
the computer devices respectively associated with the plurality of attendees are configured to start collecting the biometric sensor data at a particular time and stop collecting the biometric sensor data at a different particular time.

7. The method of claim 1, further comprising:
determining a sentiment for a selected attendee of the event based upon biometric sensor data determined for a period of time during which the selected attendee is silent.

8. A computer hardware feedback system for obtaining feedback for an event, comprising:
a memory configured to store instructions; and
a hardware processor coupled to the memory, wherein
in response to executing the instructions, the processor is configured to execute operations including:
receiving, in real-time and during the event, biometric sensor data generated by separate computer devices respectively associated with each of a plurality of attendees of the event and transmitted to the computer hardware feedback system over a communications link;
automatically performing, in real-time and during the event, a sentiment analysis, using a sentiment analyzer executing on the hardware processor, on the received biometric sensor data to determine sentiments, of the attendees, for the event;
comparing, by the sentiment analyzer and during the event, the determined sentiments to previously-stored historical biometric data for the plurality of attendees to validate the determined sentiments of the attendees, wherein the comparing includes a selected sentiment of a first attendee being validated based upon a comparison of biometric sensor data for the first attendee for a period of time with biometric sensor data for a second attendee for the period of time; and
outputting, in real-time and during the event as processed computer data to a graphical user interface of a hardware device associated with the presenter, the validated sentiments of the attendees as processed computer data.

9. The system of claim 8, wherein
the comparing includes retrieving social networking data timestamped during the event, and
a selected sentiment of a first attendee is validated based upon the social networking data for the first attendee.

10. The system of claim 8, wherein
the sentiment analyzer aggregates the processed data and the biometric sensor data to generate a time-aligned of the processed data and the biometric sensor data.

11. The method of claim 8, wherein
the biometric sensor data for a particular attendee is collected conditioned upon receiving, via an application executing within a computer device associated with the particular attendee.

12. The method of claim 8, wherein
the biometric data includes heart rate data for the at least one attendee.

13. The system of claim 8, wherein
the computer devices respectively associated with the plurality of attendees are configured to start collecting the biometric sensor data at a particular time and stop collecting the biometric sensor data at a different particular time.

14. The system of claim 8, wherein
the processor is configured to initiate operations further comprising:
determining a sentiment for a selected attendee of the event based upon biometric sensor data determined for a time period during which the selected attendee is silent.

15. A computer program product for obtaining feedback for an event, the computer program product comprising
a computer readable storage medium having program instructions embodied therewith, the program instructions executable by a computer hardware feedback system including a hardware processor to cause the computer hardware feedback system to perform:
receiving, in real-time and during the event, biometric sensor data generated by separate computer devices respectively associated with each of a plurality of attendees of the event and transmitted to the computer hardware feedback system over a communications link;
automatically performing, in real-time and during the event, a sentiment analysis, using a sentiment analyzer executing on the hardware processor, on the received biometric sensor data to determine sentiments, of the attendees, for the event;
comparing, by the sentiment analyzer and during the event, the determined sentiments to previously-stored historical biometric data for the plurality of attendees to validate the determined sentiments of the attendees, wherein the comparing includes a selected sentiment of a first attendee being validated based upon a comparison of biometric sensor data for the first attendee for a period of time with biometric sensor data for a second attendee for the period of time; and outputting, in real-time and during the event as processed computer data to a graphical user interface of a hardware device associated with the presenter, the validated sentiments of the attendees as processed computer data.

\* \* \* \* \*